United States Patent [19]

Bowen et al.

[11] 4,230,602
[45] Oct. 28, 1980

[54] PROCESS FOR PRODUCING HIGHLY ACTIVATED CARBONACEOUS PRODUCTS

[75] Inventors: Mack D. Bowen, Smyrna; Kenneth R. Purdy, Decatur, both of Ga.

[73] Assignee: American Can Company, Greenwich, Conn.

[21] Appl. No.: 84,294

[22] Filed: Oct. 12, 1979

[51] Int. Cl.³ .............. C01B 31/10; C10B 49/04; C10B 53/02
[52] U.S. Cl. .................. 252/421; 48/209; 201/21; 201/25; 201/27; 201/34; 201/37; 201/38; 201/44
[58] Field of Search ............ 201/2.5, 21, 25, 27, 201/34, 37, 38, 44, 45, 39; 252/421; 48/209

[56] References Cited

U.S. PATENT DOCUMENTS

| 1,918,467 | 7/1933 | Goskar | 252/421 |
| 2,162,763 | 6/1939 | Stuart | 252/421 |
| 4,122,036 | 10/1978 | Lewis | 201/25 X |

Primary Examiner—Joseph Scovronek
Attorney, Agent, or Firm—Robert P. Auber; Ira S. Dorman; Stuart S. Bowie

[57] ABSTRACT

A single-pass, continuous process converts organic feedstocks into activated carbonaceous products having high surface area values. The introduction of air and steam into the bed of material at selected locations, and at controlled rates, enables the economic, dependable and convenient production of such products, while maximizing the efficiency of energy utilization.

25 Claims, 2 Drawing Figures

PROCESS FOR PRODUCING HIGHLY ACTIVATED CARBONACEOUS PRODUCTS

BACKGROUND OF THE INVENTION

Activated carbon is, of course, a valuable commodity which has a wide variety of uses in industrial and consumer applications. By-and-large, the more highly activated the carbon is, the greater will be its value in the marketplace, since its adsorptivity is directly proportionate to its level of activation. While products having surface area values of less than 400 square meters per gram do have limited utility as activated carbons, the most desirable materials have higher values, and preferably in the range of the about 600 to 900 square meters per gram. The present invention is directed to a method for the production of solid carbonaceous products having specific surface areas of at least 400 square meters per gram.

Heretofore, the most effective and widely used commercial techniques for producing activated carbon have employed a two-step procedure, in accordance with which the carbonaceous feedstock is first carbonized to produce charcoal or coke, following which that intermediate product is activated in a subsequent step carried out, for example, in an indirectly-fired rotary kiln or multi-hearth furnace. However, such an approach, as conventionally practiced, suffers from a number of disadvantages.

More particularly, since the second (activation) step of the operation is normally carried out at a location different from that at which the first is effected, there are not only transportation costs to consider but, most disadvantageously, there is a substantial waste of thermal energy associated with normal handling and movement of the hot char. This is especially unfortunate because the activation reaction is endothermic, and requires large quantities of heat, which must therefore be obtained from a supplementary source. It is also evident that a two-step process inherently involves undue handling of rather difficult and offensive materials, introducing added cost and inconvenience factors.

The prior art does provide suggestions that solid carbonaceous products can be produced in a single step, which products may, in some instances, be more-or-less activated. Exemplary prior art includes U.S. Pat. Nos. 1,524,784, to DeBartolomeis; 3,525,674 to Barnebey; and 4,145,256 to Bowen. However, as will be evident from the description of the instant invention hereinafter set forth, none of those patents discloses a method which affords the advantages realized by the practice of the present method. Thus, broadly stated, no prior art process known to applicants permits the production of good yields of highly activated carbonaceous products in a single-pass, continuous operation, while minimizing energy requirements, and doing so in a manner which is economical, uncomplicated, efficient and subject to ready control to vary the nature and the quality of the products obtained.

Accordingly, it is the primary object of the present invention to provide a novel method whereby highly activated, carbonaceous products can be produced efficiently and economically, with a minimum consumption of energy.

It is also an object of the invention to provide such a method which can be effected in a single step, and in a manner which is convenient and subject to ready control, so as to permit reproducibility and facile variation of the nature and quality of the products obtained.

Another object is to provide a novel method having the foregoing advantages, and which is capable of producing a dry, solid product at a relatively low temperature, thus permitting facile handling of the product and minimizing the need for subsequent operations in connection therewith.

A further object of the invention is to provide such a method, which is adapted to be carried out in a reaction system which is relatively simple and inexpensive to construct and operate.

Yet another object of the invention is to provide a novel method of the foregoing nature, in which the amount of steam introduced into the reaction vessel is miminized, and in which no external supply of fuel need be provided.

SUMMARY OF THE DISCLOSURE

It has now been found that the foregoing and related objects of the present invention are readily attained in a single-pass, self-sustaining, continuous process comprising, as the initial step, introducing to the top of a vertical reactor a substantially dry feed material capable of thermal decomposition to a gaseous component and a solid activated carbonaceous product. The material so introduced is substantially continuously moved, as a packed bed and at a predetermined rate, downwardly through and outwardly from the bottom of the reactor, while gases are withdrawn upwardly therethrough and outwardly therefrom. Air is injected into the bed at a multiplicity of levels which are vertically spaced from one another and from the top and bottom of the reactor, to establish a primary activation zone of substantial depth. The air is injected at the several levels at significantly different rates, which are independently controlled so as to distribute the air and to thereby render the primary zone substantially isothermal, with the material therein having a substantially uniform temperature of 1400° to about 2100° Fahrenheit. At a location spaced downwardly from the primary zone, low temperature steam, in the substantial absence of oxygen, is injected to establish a secondary activation zone of substantial depth below the primary zone. The steam is injected at a rate which is just adequate to transport sufficient thermal energy from the secondary activation zone to the top of the bed for drying and thermal decomposition of the feed material, to produce a temperature of about 250° to 600° Fahrenheit in the off-gases, and to cool the material exiting from the secondary activation zone to a temperature of about 200° to 1500° Fahrenheit. The exiting material will comprise a substantially dry, activated carbonaceous product having a surface area of at least 400 square meters per gram.

In preferred embodiments of the invention, the carbonaceous product will have a surface area of about 600 to 900 square meters per gram, the uniform temperature of the material present in the activation zone will be about 1600° to 1800° Fahrenheit, and the feed material, introduced at a rate of about 100 to 20,000 pounds per hour, will contain less than about ten weight percent of moisture, based upon the moist weight of the feed material. Furthermore, in such embodiments, the primary activation zone will have a cross-sectional area of about one to 100, and most desirably about 15 to 40, square feet, and a depth of about one to five feet.

In most instances, the air will be injected into the primary activation zone at least at three vertically spaced levels. The combined rate of injection may desirably provide less than the amount of oxygen stoichiometrically necessary to oxidize all gaseous products of reaction produced in the primary activation zone, to thereby minimize the exothermic oxidation of solid carbon present therein. More specifically, the combined rate of air injection will be generally less than one pound of air per pound of feed material, on a moisture-free basis. When the carbonaceous product is to have a specific surface area ranging from about 600 to 900 square meters per gram, the combined air injection rate will be about 0.25 to 0.75 pound of air per pound of feed, and will be proportionate to the product specific surface area. Generally, the air will be distributed throughout the primary zone at upwardly diminishing rates. Typically, those rates will range from about 0.51 to 0.72 pound of air per pound of feed per foot of zone thickness, at the bottom of the primary zone, to about 0.07 to 0.15 pound of air per pound of feed per foot of zone thickness, at the top of the primary zone.

The steam employed in the process will have a temperature of less than about 600° Fahrenheit, and generally its temperature will be about 250° to 300° Fahrenheit. The steam injection rate will normally be about 0.025 to 0.2 pound per pound feed material, on a moisture-free basis, and preferably that value will be in the range of about 0.05 to 0.15 pound per pound. The average residence time of the material in the primary activation zone will be from about three to 180 minutes; preferably the period of residence will be about five to 90 minutes; and most desirably it will be about 15 to 60 minutes in duration.

DETAILED DESCRIPTION OF THE ILLUSTRATED AND PREFERRED EMBODIMENTS

Figure 1:
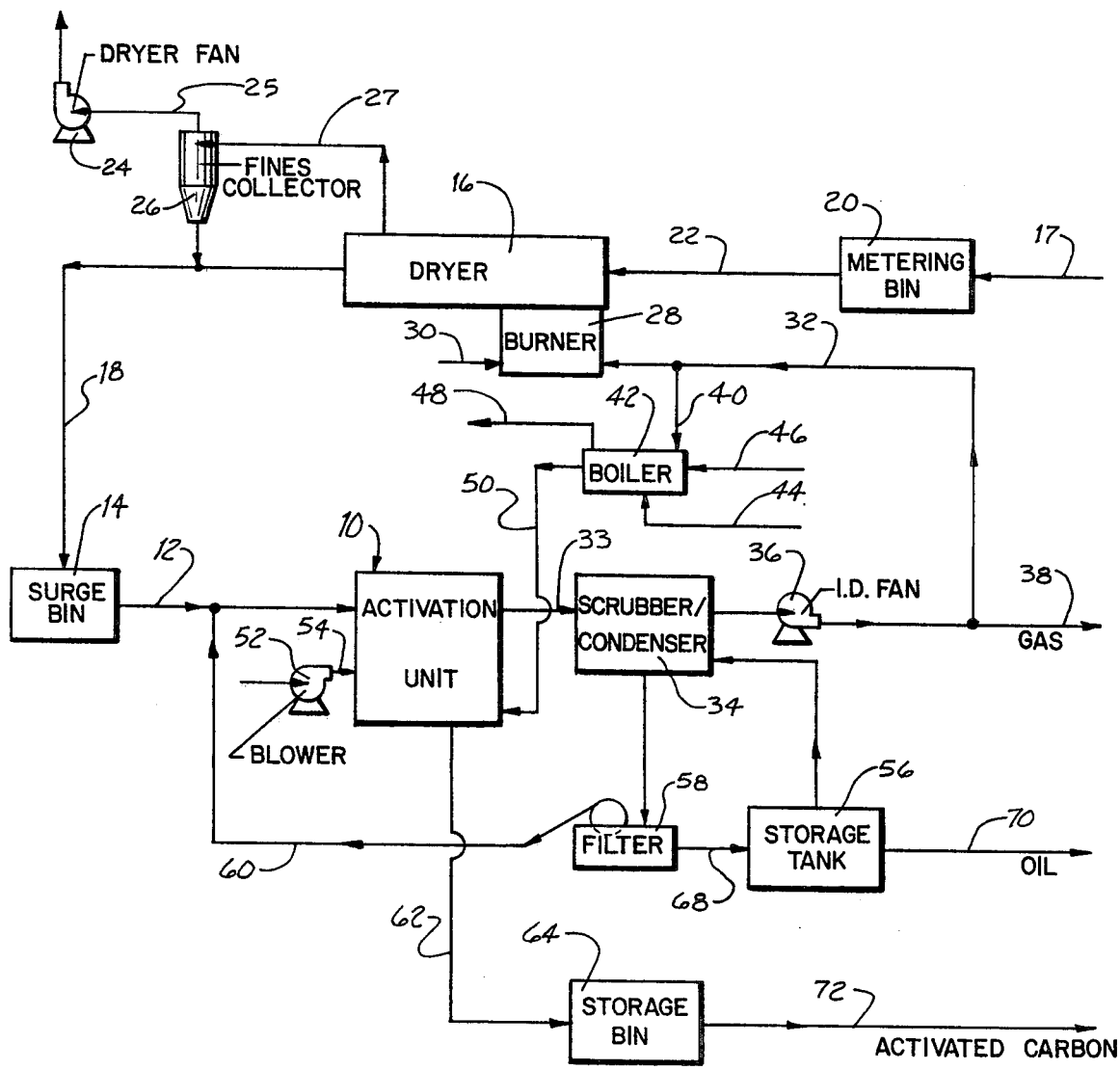
FIG. 1 is schematic illustration of a typical system in which the one-step activation process of the present invention may be carried out.

Turning now in detail to FIG. 1 of the appended drawings, at the heart of the system therein illustrated is an activation unit, generally designated by the numeral 10. Feedstock is introduced into the top of the activation unit through conduit 12, which connects to a surge bin 14 which, in turn receives feedstock from the dryer 16 through connecting conduit 18; the dryer 16 is charged, through conduit 22, with moist feedstock from the metering bin 20, which is supplied (from a source not shown) through conduit 17. The dryer 16 has an associated fan 24, which serves to exhaust the hot gases through a finer collector 26 via conduits 25, 27. It also has an associated burner 28; air for combustion is provided to the burner 28 through inlet 30, and fuel gas is provided thereto through line 32. As can be seen, the source of the fuel gas is the activation unit 10; it is drawn therefrom, through line 33 and through a scrubber/condenser unit 34, by a variable-speed induced-draft fan 36, and a portion of the gas is normally discharged from the system through line 38 (which connects with line 32) as a fuel gas product. Another portion of the fuel gas generated in the unit 10 is delivered through line 40 to a boiler 42, where water and combustion air (introduced through lines 44 and 46, respectively), are used to generate steam, which is delivered to the activation unit 10 through line 50; exhaust gas is removed from the boiler 42 through line 48. An appropriate blower 52 supplies combustion air to the reactor 10 through line 54.

Considering in somewhat greater detail scrubber/condenser 34, it may operate utilizing a spray of pyrolytic oils produced in the activation unit 10 (as will be more fully discussed hereinafter). Regardless of its nature, the scrubbing medium is delivered to the unit 34 from a storage tank 56. The nongaseous products pass from the bottom of scrubber 34 into a filtration unit 58, from which the filter cake is recovered and charged (together with the dried feedstock) to the top of the activation unit 10 through conduit 12 (conduit 60, from the filtration unit 58, communicating therewith). The oil removed by filtration is returned through line 68 to the storage tank 56, from which a portion may be withdrawn through line 70 for other purposes (e.g., as a fuel product), if desired. The solid activated carbon product is discharged from the bottom of the activation unit 10 through conduit 62 and is delivered to a storage bin 64, from which it may be withdrawn through line 72.

Figure 2:
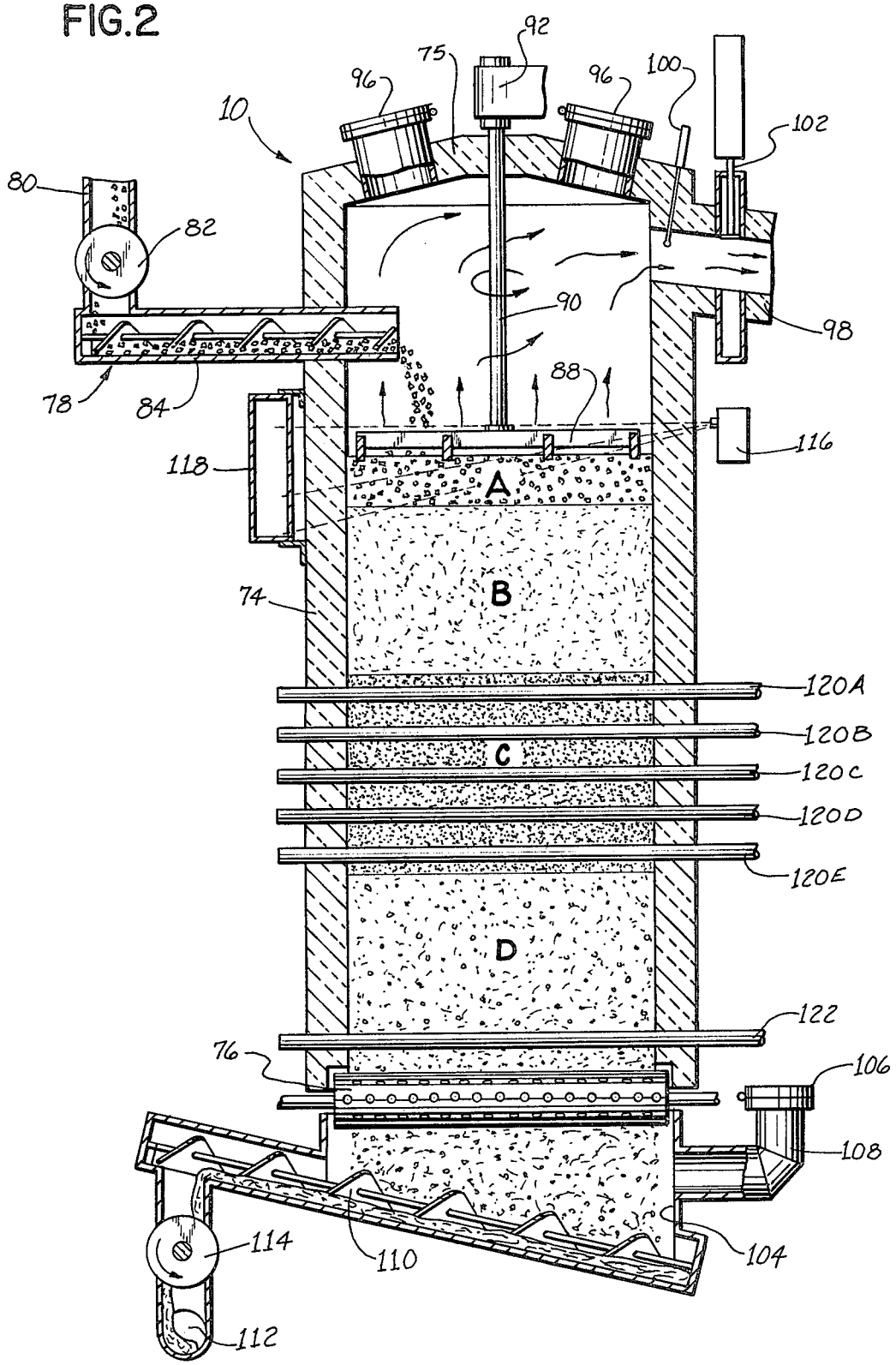
FIG. 2 is a vertical, cross-sectional view of a reactor, with associated apparatus, which is suitable for use in the system of FIG. 1, and in carrying out the process of the invention.

Turning now in detail to FIG. 2 of the drawings, the reactor 10 consists of a refractory-lined vertical shaft 74 and top wall 75, with output metering device 76 at the lower end of the shaft 74 and an infeed mechanism, generally designated by numeral 78, near the upper end thereof. The infeed mechanism 78 consists of an inlet passageway 80 leading to a rotary valve 82, and a connecting screw conveyor section 84. Extending through the top wall 75 is a leveling device, consisting of a rabble head 88 rotatably mounted on the shaft 90, and supported in an appropriate drive fixture 92, and pressure-relief devices 96, are provided thereon. An insulated duct 98 provides a gas conduit from the top of the reactor 10, and a suitable temperature detector 100 and a shut-off gate mechanism 102, which serves to isolate the reactor from the downstream portions of the off-gas system, are also provided.

A gas-tight plenum 104 is situated at the bottom of the reactor 10 beneath the output metering device 76, for the purpose of receiving the hot activated-carbon product; it too is provided with a pressure relief device 106, fitted to the vent conduit 108. The product is removed from the plenum 104 by an inclined screw conveyor 110, which communicates with a second outfeed conveyor 112 through an appropriate rotary valve 114. The purpose of using rotary valves in the present system is, of course, to limit the introduction of air thereinto; the pressure relief devices are provided to protect the reactor against explosive combustion, which may occur notwithstanding the measures taken to prevent air leakage, especially since the reactor is normally operated under a slight negative pressure.

Diametrically disposed on the sidewall of the vertical shaft 74 are a gamma-ray generator 116 and a gamma-ray detector 118; these devices cooperate to indicate the level of the top of the bed of material within the shaft 74, and serve to control (by means not shown) the infeed system 78. Mounted through the walls of the shaft 74, on five levels, are air injection pipes 120A–120E; on a sixth level, spaced below the lowermost air pipe 120E, is a steam injection pipe 122. Although not illustrated, the air pipes 120 are provided with jacketing for the purpose of circulating cooling water thereabout; this is essential if the pipes are to withstand, for a practical period of time, the intense heat to which they are exposed. Also not shown is the true configuration of the pipes 120 and 122 which, in reality, consist of a system of pipe sections arranged as a number of planar grids, so as to afford maximum uniformity of gas introduction at each level, horizontally across the bed. The pipes are also provided with many small holes, again for the purposes of providing a uniform discharge therefrom.

The general manner in which the reactor 10 operates will be readily appreciated by those skilled in the art. Thus, feedstock is introduced through the mechanism 78, and is deposited upon the existing bed confined within the shaft 74. The leveling device is rotated so as to cause the rabble head 88 to uniformly distribute the fresh material, thereby minimizing channeling (or a chimney effect) of gases rising upwardly through the bed, and also promoting accurate measurement of the level of the bed by the gamma-ray devices 116, 118. The latter capability is, of course, important for accurate control of the process which, in turn, is necessary to ensure that products having the desired characteristics are obtained. The outfeed metering device 76 controls the rate of descent of the material through the reactor 10, permitting it to pass in sequence through the various zones which are established therewithin, as will be discussed in greater detail hereinafter. In any event, the solid carbonaceous product is ultimately discharged into the plenum 104, from which it is removed by operation by the screw conveyors 110, 112.

In a broad sense, the process of the present invention proceeds as follows: Once steady-state conditions have been reached, the rising hot gases first completely dry the feedstock, and then effect pyrolysis of the solid material as it descends through the upper part of the reactor. With reference to FIG. 2 of the drawings, these two effects occur in the drying zone (designated A) and the thermal decomposition zone (designated B), respectively. The hot char from the pyrolysis reaction then enters the primary activation zone (designated C), where the air introduced exothermically oxidizes locally-generated gaseous fuels. The resulting hot gases heat the charcoal, thereby supporting the endothermic activation reactions. Specifically, the hot char reacts with water vapor and carbon dioxide, present in the primary activation zone, to produce the gaseous fuels, hydrogen and carbon monoxide, while activating the char.

Steam injected at the bottom of the secondary activation zone (designated D) simultaneously cools the char and brings it to its ultimate level of activation; the steam also functions as a medium for thermal energy transfer to the upper regions of the bed. It will be appreciated that, although the zones A-D are shown in FIG. 2 to have definite boundaries, this has been done only for purposes of illustration, and that the borders therebetween will actually be transitional and indistinct.

From a chemical standpoint, the carbon-steam reactions, in which steam reacts with incandescent carbon to produce hydrogen and carbon monoxide (at temperatures above 1800° Fahrenheit) and carbon dioxide (at temperatures significantly below 1800° Fahrenheit), are fundamental to the activation mechanism, and to the instant process. Activation also occurs through the reaction of carbon with carbon dioxide to produce carbon monoxide. Since the activation reactions are highly endothermic, the present process relies upon exothermic gas-phase reactions for the purposes of generating the thermal energy necessary to support the activation process. The principal gas-phase reactions (which occur in the primary activation zone) include the oxidation of hydrogen and carbon monoxide to produce, respectively, water (steam) and carbon dioxide. The regeneration of steam and carbon dioxide in the primary activation zone, through the reactions noted, is of fundamental importance to the invention, as will be more fully discussed hereinafter.

Illustrative of the present invention are the following specific examples:

EXAMPLE ONE

Pine chips, having a moisture content of five percent by weight (wet basis), are fed at a rate of 6,000 pounds per hour (dry basis) to a reactor constructed as shown in FIG. 2 hereof. The bed contained within the reactor has an overall height of approximately nine feet, as measured from the top of the bed to the out-put metering device, and four zones are identifiable therein. Considering the bed from the top downwardly, there is first a drying zone about one foot deep, a thermal decomposition zone about four feet deep, a primary activation zone about one foot deep, and a secondary activation zone about three feet deep; below the steam introduction level, a shallow predischarge zone also exists. The bed is generally circular in cross-section, and has a diameter of about seven feet.

Within the primary activation zone are provided four air injection pipe grids; the grids substantially span the reactor and are disposed at levels which are spaced a distance of 3 inches from one another. The pipes are cooled by water to protect them from the high temperatures developed in the primary activation zone, and the thermal loss due to this cooling system is about 50 BTUs per pound of dry feed processed. Once steady-state operation has been achieved following startup, the rate of air (in pounds per hour) introduced through each of the air pipe grids is, in descending order (from the top of the zone to the bottom): 253, 298, 376 and 570, respectively, giving a cumulative injection rate of 1497 pounds per hour. Under the conditions of operation, a substantially isothermal condition is established in the primary activation zone, at a temperature of 1800° Fahrenheit. Saturated steam, at a temperature of 250° Fahrenheit, is introduced at the bottom of the secondary activation zone at a rate of 706 pounds per hour, and dry, activated carbon is recovered from the reactor at a temperature of 850° Fahrenheit, and at the rate of 1406 pounds per hour; the carbon has a specific surface area of 600 square meters per gram.

EXAMPLE TWO

A reactor, having the same construction as described in Example One is employed, modified however by the utilization of ten levels of air introduction. The drying zone is approximately one foot deep, the thermal decomposition zone is approximately four feet deep, the primary activation zone is about five feet deep, and the secondary activation zone is about three feet deep. The same feed rate and feedstock is also used, but at a moisture content of ten percent by weight.

The air introduction pipes are spaced, from top to bottom, with a distance one foot between the first and second and the second and third levels, with one-half foot between the third and fourth, fourth and fifth, fifth and sixth, and sixth and seventh levels, and with a distance of one-quarter foot between the seventh and eighth, eighth and ninth and ninth and tenth levels, respectfully. The air introduction rates, from top to bottom, are (in pounds per hour): 469, 546, 324, 375, 426, 529, 298, 375, 452 and 732. Again, an isothermal temperature of 1800° Fahrenheit is maintained in the primary activation zone; however, because the achievement of optimum air distribution dictates unequal spacing between the levels, the absolute rates of air introduction do not, as can be noted, increase uniformly from top to bottom, as was true in the foregoing Example.

In this instance, saturated process steam at 250° Fahrenheit is introduced at a rate of 493 pounds per hour. The off-gas stream temperature is 514° Fahrenheit, and the heat loss to the cooling system for the air introduction pipes is 350 BTUs per pound of dry feed. Under these conditions, 1,052 pounds per hour of dry carbonaceous product, activated to a level of 900 square meters per gram and at a temperature of 919° Fahrenheit, is recovered from the reactor.

While it is appreciated that certain single-pass prior art processes produce some degree of activation in the carbonaceous products recovered, this invention is concerned with the attainment of commercially practical levels of activation, achieved through the introduction of steam and air in accordance with the novel practices set forth herein, rather than with such passively activated materials as may be produced incidentally by the practice of earlier methods.

At the level of about 400 square meters per gram, the activated carbon represents what is generally considered to be a threshold product for commercial purposes; more desirably, the product will have a level of activation of at least 500 square meters per gram, and preferably its activation level will be in the range of about 600 to 900 square meters per gram. So as to avoid possible misunderstanding, it might be mentioned that the surface area values referred to herein are based upon a nitrogen determination. It should also be mentioned that a similarly appropriate way to characterize adsorptivity of activated carbon is by an "iodine number" expression; however, the numerical values will be substantially the same, regardless of which system is used.

Insofar as the specific organic feedstock is concerned, to be suitable for use in the present process it must, of course, be capable of thermal decomposition, to produce a solid carbonaceous product which is capable of attaining commercial levels of activation. Moreover, as a practical matter, it is preferable that the feedstock be a waste material which is readily available in ample amounts, so as to maximize the economic factors and the benefits of the invention. Thus, while a number of suitable feedstocks will be evident to those skilled in the art, the most desirable material for use herein is wood waste, in view of the vast amounts that are generated throughout the world, the want of optimal end usages for it, and the high quality of activated carbon which can be produced. Other suitable feed materials that might be mentioned include sugar cane bagasse, straw, rice hulls, peanut shells and similar agricultral waste materials. It should also be appreciated that the method does not require the use of a totally unconverted feedstock, since materials which have been carbonized to some degree may constitute all or a portion of the material to be treated. In any event, the feedstock should be quite dry, with a moisture content of ten percent representing a practical upper limit; thus, it may be necessary to predry the material so as to make it suitable to use.

As indicated, the solid material being converted moves downwardly through the reactor as a packed bed, in which strata at different stages of reaction can be identified; this is to be contrasted with some prior methods in which reaction occurs in a fluidized bed, wherein the material tends to be homogeneous. The need for stratification imposes one practical upper limit upon total volume of air and steam which is introduced into the reactor, since an excessive volume of gaseous substances will tend to produce fluidization.

Approximately 100 to 20,000 pounds of feed material will generally be handled in a reactor of the sort which is above described; this will generally produce about 17 to 4600 pounds per hour of activated carbon, it being understood, of course, that the weight of solid product produced will depend upon the activation level thereof. In other words, since more of the carbon must be consumed in achieving the higher levels of activation, the quantity which can be recovered is concomitantly reduced. Again, subject to the level of activation of the product, conversion rates of from 17 to 23 percent, based upon the weights of dried feed stock and of dry product, are typically attained in the practice of the present method.

For practical operation, residence times in the primary activation of zone from three to 180 minutes will usually prevail. More generally, those times will be on the order of five to 90 minutes, and preferably they will be from 15 to 60 minutes, assuming (in the latter case) temperatures of about 1600° to 1800° Fahrenheit, and a product having a specific surface area of about 400 to 600 square meters per gram. Thus, it must be borne in mind that the residence time in the primary activation zone will be a function not only of the temperature that exists therein, but also of the level of activation that is to be exhibited by the final product. For example, if a material having an activation level of 400 square meters per gram is to be produced at a temperature of 1800° Fahrenheit, a residence time of five minutes in the primary activation zone may be typical. On the other hand, if the temperature is raised to about 1870° Fahrenheit, the residence time could be reduced about to three minutes.

A fundamental feature of the method of the present invention concerns the controlled air introduction at the intermediate region of the bed, which constitutes the primary activation zone. One essential function of the air is to provide the thermal energy necessary to sustain the endothermic activation reactions, and to compensate for the heat losses to the protective cooling system, provided for the air introduction grids. A second essential function of the air is that of producing most of the steam necessary for the activation reaction, so as to minimize the amount externally introduced. Finally, proper control of air is essential to the avoidance of overheating and excessive exothermic combustion of the solid carbon present therein.

As indicated, the thermal energy required for the activation reactions is supplied by the sensible heat of the carbon, which heat is generated by gas-phase oxidation reactions taking place in the primary activation zone. However, in order to achieve desirable levels of activation, it is crucial that the carbon not be overheated, since overheating causes collapse of the pores which develop throughout the carbon, and are the means by which high surface area, and hence activation, is produced.

While serious overheating of the carbon will not generally occur at temperatures lower than about 2100° Fahrenheit, it is nevertheless preferable to limit the temperature of the carbonaceous material in the primary zone to a maximum of about 1800° to 1900° Fahrenheit. At temperatures below 1400° Fahrenheit, the activation reactions will simply not occur effectively or efficiently; therefore, that represents a practical lower limit of temperatures at which the primary activation zone should be operated.

To provide adequate thermal energy in the primary activation zone, while at the same time avoiding overheating of the char, the air for oxidation must be distributed throughout that zone in such a manner as will produce substantially isothermal conditions therein, at an optimum temperature. This necessitates introduction of the air into the primary activation zone at plural (i.e., two or more) levels, and preferably the number of air introduction levels will be 3 to 5. While ten (or perhaps more) levels may be used, it should be appreciated that too many air pipes will tend to obstruct the reactor, and thereby cause serious operational difficulties, by impeding natural gravitational movement of material therethrough. If, on the other hand, one were to introduce all of the air at a single level, temperatures on the order of about 2500° to 2800° Fahrenheit would have to be generated to provide sufficient thermal energy to support the reaction conditions that are necessary to attain the desired levels of activation. Also, a "loop" effect tends to develop under such circumstances, insofar as the generation of high temperatures requires that more carbon be endothermically consumed (since the locally over-heated condition will limit activation), with the additional quantity of carbon imposing, in turn, excessive thermal energy demands upon the system.

As indicated by the Examples, the levels of air introduction may or may not be equidistantly spaced from one another. Consequently, while it will generally be necessary to inject the air at upwardly diminishing rates (based upon the amount of solid material affected by the oxygen), so as to establish isothermal conditions in the primary activation zone, the rates of air injection on an absolute basis may not vary in that manner. The particular arrangement and configuration of air pipes will depend upon many factors, including conditions of operation, the nature and quality of the feedstock and of the product desired, the configuration and dimensions of the bed, etc. In any event, as can be seen, the number of air levels provided and the spacing therebetween will have a fundamental bearing upon the rate at which air is introduced at any given level.

It is rather surprising to note that, except as may be necessary to ensure that a minimum off-gas temperature of 250° Fahrenheit is maintained (for reasons that will be more fully discussed hereinbelow), the amount of air introduced will be substantially independent of the energy requirements of the processes which occur in the upper regions of the bed (i.e., drying and pyrolysis). The oxygen provided will preferably be less than that which would theoretically be required to oxidize all of the gaseous products of reaction generated in the primary activation zone, so as to thereby minimize the exothermic oxidation of the carbon present therein. As will be appreciated, oxidation will occur initially in the gaseous state; only thereafter will the solid carbon be burned in substantial amounts.

The secondary activation zone is, of course, that region of the bed which lies above the level of steam injection, and below the primary activation zone, as defined generally by the lowermost level of air introduction. The primary function of the steam is that of heat recovery. Essentially, this is for the purpose of providing thermal energy to support the upper bed processes of drying and thermal decomposition of the feed; but it also serves to preheat the steam before it enters the primary activation zone (thereby avoiding thermal overloading and overheating of the carbon present at the bottom of that zone), and to support the desired off-gas temperature. The steam also provides the reactant necessary to initiate the carbon-steam reaction which occurs during the process but, as has been indicated hereinabove, the amount of introduced steam necessary to sustain that reaction is minimal.

Thus, it is now appreciated that, throughout the activation zones (predominately the primarly activation zone, where free oxygen is readily available), steam is constantly being regenerated, by hydrogen oxidation, and consumed, by reaction with carbon. Hence, it is necessary to introduce into the reactor considerably less steam than would stoichiometrically be required to attain, by other means, the levels of activation which the present method provides; e.g., the amount of steam may be less than that which would be consumed if the activation were effected in an externally-fired rotary kiln. Specifically, in Examples One and Two hereinabove set forth, the amounts of steam injected into the bed are, respectively 172 percent and 52 percent of the amounts which would be theoretically required by an externally-fired rotary kiln. Nevertheless, it should be appreciated that it may be necessary to use even more than the stoichiometric amount of steam required for a nonregenerative process, so as to ensure the presence of a sufficient volume of gaseous medium for purposes of adequate mass transfer. In theory, the amount of steam introduced for activation purposes need only be that which will initiate the carbon-steam reaction with the carbon, in view of the steam regeneration that takes place within the primary activation zone. Use of such a theoretical minimum amount is not, however, considered to be practical, because of the depth of the bed and the high residence times that would be necessary for satisfactory activation under such circumstances. In any event, it can be appreciated that the quantity of steam introduced need not be stoichoimetrically related to the weight of the carbon which is to be activated, nor to the level of activation ultimately to be achieved. Limiting the amount of steam introduced not only conserves energy, but it also introduces a degree of freedom into the process. Thus, because the steam is not a limiting factor, it affords leeway in terms of cooling and further processing of the carbon in a controllable atmosphere, and within variable temperature and time frames. It also stabilizes the activation process by continuously exchanging the steam environment which exists within the reactor.

Typically, the partially activated carbonaceous material from the primary activation zone enters the secondary activation zone at a temperature of about 1600° to 1800° Fahrenheit; it exits from the secondary activation zone at a temperature of about 200° to 1500° Fahrenheit. It might be pointed out that measures are taken to prevent, or at least minimize, the admission of oxygen into the secondary activation zone, because such reactions occurring therein will generate heat and consume carbon, neither of which effects is desirable in that region of the bed.

The material exiting from the bottom of the reactor will be a substantially dry solid carbonaceous product having a level of activation of 400 square meters per gram, or higher. Its ratio to the amount of feed employed will, as hereinabove noted, depend to an extent upon the level of activation which is achieved; nevertheless, typical conversion ratios are about 0.17 to 0.27:1.0. The yield of product will also vary depending upon many factors including, fundamentally, the level of activation of the product; for example, approximately 16 percent of the charcoal produced from a pine wood feedstock would typically be endothermically consumed to produce a product having a level of activation of 600 square meters per gram.

In addition to the solid product, the present process will produce a gaseous product, comprised of those gases which pass from the primary activation zone, combined with vaporized tars and oils, and gases which are produced by the thermal decomposition and drying which occur in the regions of the bed above the primary activation zone. From this gaseous stream, a fraction may be condensed to produce a pyrolytic oil, which may be employed as a fuel source within the system, and/or externally. As indicated hereinabove, the pyrolytic oil may also be utilized for the purpose of scrubbing the gas stream, so as to remove solid particles and to produce a more refined gaseous product which may, of course, also be used as a fuel source.

The temperature of the outlet gas will generally be in the range of 250° to 600° Fahrenheit, depending upon the activity of the carbon product, the moisture content of the feed, and the amount of steam introduced. As has previously been indicated, a temperature below 250° Fahrenheit is undesirable; at lower temperatures, excessive condensation occurs on the relatively cool particles in the upper portions of the bed, thus causing bridging to occur and ultimately inhibiting movement of the bed through the reactor.

Regarding configuration, the reactor will generally be cylindrical; the cross-sectional area will normally be about one to 100 square feet, with a preferred area being 15 to 40 square feet, and a typical value being approximately 25 square feet. The depth of the primary activation zone will generally range from about one to five feet, with the fundamental criterion being the provision of sufficient depth to provide adequate residence time for the achievement of the level of activation which is to be attained therein. The secondary activation zone will usually be about two to three feet deep, and the upper bed regions will usually be about five feet deep; consequently, the overall bed depth will typically be on the order of about 9 to 13 feet.

In the present process, certain parameters may be identified as being either independent or dependent. The independent parameters (i.e., those which can be selected and set) are: the nature of the feedstock, its moisture content, the processing rate (i.e., the feed rate), the isothermal temperature of the primary activation zone, the activity level of the carbonaceous product, and its discharge temperature. Dependent properties (i.e., those which either result from or are dictated by the independent parameters) include: the rates of process air and steam employed, the amount of heat lost to the air introduction cooling system, the off-gas stream temperature, the yield of carbonaceous product produced, and the theoretical amount of steam required for the activation reaction (as opposed to the amount of steam which need actually be introduced into the system). Thus, once the activity level, primary activation zone temperature, and heat loss are specified or known, the amount of process air required can be determined. Furthermore, by specifying the carbon discharge temperature, the amount of process steam to be injected can be determined completely independently of the theoretical (i.e., stoichoimetric) amount consumed in an externally-fired activator, such as a rotary kiln. Hence, within reasonable bounds, which will be apparent to those skilled in the art, it is possible to set the feed input rate and moisture content, the carbon product activity level, the primary activation zone temperature, and the primary activation zone depth and, on the basis of those parameters, to then determine appropriate values for the air and steam introduction rates, for the air distribution profile, and for the off-gas stream temperature.

Thus, it can be seen that the present invention provides a method whereby highly activated carbon can be produced efficiently and economically, and with minimum expenditures of energy. The method is effected in a single step, and in a manner which is convenient and well-suited to controlled variation, so as to permit the production of a varity of desirable products. It is capable of producing a dry, relatively cool solid product, thereby permitting facile handling, and it is adapted to be carried out in a reaction system which is relatively simple and inexpensive to construct and operate. The invention provides a method for the continuous production of activated carbon having a controllable and reproducible range of activity levels and adsorption characteristics. Finally, the amount of steam introduced into the reaction vessel is minimized, and there is no need to supply any fuel from an external source to support the process. All energy for the process is supplied by the sensible heat of the char which, in turn, is substantially generated by exothermic, gas-phase oxidation of the hydrogen and carbon monoxide generated by the endothermic activation reactions. The controlled introduction of air at a plurality of levels, and of steam at the bottom of the reactor, enables such operation, while avoiding carbon overheating and minimizing the amount of steam consumed.

Having thus described the invention, we claim:

1. In a single-pass, self-sustaining, continuous process for the production of an activated carbonaceous product having a surface area of at least 400 square meters per gram, the steps comprising:
   (a) introducing to the top of a vertical reactor a substantially dry feed material capable of thermal decomposition to a gaseous component and a solid activated carbonaceous product;
   (b) substantially continuously moving said material, as a packed bed and at a predetermined rate, downwardly through and outwardly from the bottom of said reactor, while withdrawing gases upwardly therethrough and off-gases outwardly therefrom;
   (c) injecting air into said bed at a multiplicity of levels which are vertically spaced from one another and from said top and bottom of said reactor, to establish a primary activation zone of substantial depth, said air being injected at said levels at significantly different rates independently controlled so as to distribute it, and to thereby render said primary zone substantially isothermal, with said material therein having a substantially uniform temperature of 1400° to about 2100° Fahrenheit;
   (d) injecting low temperature steam, in the substantial absence of oxygen, into said bed at a location spaced downwardly from said primary zone, to establish a secondary activation zone of substantial depth below said primary zone, said steam being injected at a rate just adequate to transport sufficient thermal energy from said secondary activation zone to the top of said bed for drying and thermal decomposition of said material, to produce a temperature of about 250° to 600° Fahrenheit in said off-gases and to cool said material exiting from said secondary zone to a temperature of about 200° to 1500° Fahrenheit;
said exiting material comprising a substantially dry activated carbonaceous product having a surface area of at least 400 square meters per gram.

2. The process of claim 1 wherein said carbonaceous product has a surface area of about 600 to 900 square meters per gram, and wherein said uniform temperature of said material in said primary activation zone is about 1600° to 1800° Fahrenheit.

3. The process of claim 1 wherein said air is injected into said primary activation zone at a combined rate such as to provide less than the amount of oxygen stoichiometrically necessary to oxidize all gaseous products of reaction produced in said zone, and so as to minimize the exothermic oxidation of solid carbon present therein.

4. The process of claim 3 wherein said combined rate of air injection is less than one pound of air per pound of said feed material, on a moisture-free basis.

5. The process of claim 4 wherein said combined air injection rate is about 0.25 to 0.75 pound of air per pound of said feed, and is proportionate to said surface area of said product, said surface area ranging from about 600 to 900 square meters per gram.

6. The process of claim 5 wherein said independent rates of air injection vary so as to distribute said air throughout said primary zone at upwardly diminishing rates, based upon the depth thereof.

7. The process of claim 6 wherein said independent air injection rates range from about 0.51 to 0.72 pound of air per pound of said feed per foot of depth, at the bottom of said primary zone, to about 0.07 to 0.15 pound of air per pound of said feed per foot of depth, at the top of said primary zone.

8. The process of claim 1 wherein said air is injected into said primary activation zone at least at three said vertically spaced levels.

9. The process of claim 1 wherein said primary activation zone is about one to 100 square feet in cross-sectional area.

10. The process of claim 9 wherein said cross-sectional area is about 15 to 40 square feet.

11. The process of claim 1 wherein said primary activation zone is about one to five feet in depth.

12. The process of claim 1 wherein the average residence time of said material in said primary activation zone is about three to 180 minutes.

13. The process of claim 1 wherein said average residence time is about five to 90 minutes.

14. The process of claim 1 wherein said average residence time is about 15 to 60 minutes.

15. The process of claim 1 wherein said steam temperature is about 250° to 300° Fahrenheit.

16. The pocess of claim 1 wherein said steam injection rate is about 0.025 to 0.2 pound per of said feed material, on a moisture-free basis.

17. The process of claim 16 wherein said steam injection rate is about 0.05 to 0.15 pound per pound.

18. The process of claim 1 wherein said feed material contains less than about ten weight percent of moisture, based upon the moist weight of said feed material.

19. The process of claim 18 wherein said feed material is introduced into said reactor at a rate of about 100 to 20,000 pounds per hour.

20. In a single-pass, self-sustaining, continuous process for the production of an activated carbonaceous product having a surface area of about 600 to 900 square meters per gram, the steps comprising:
  (a) introducing to the top of a vertical reactor a feed material containing less than about 10 percent by weight of moisture, and capable of thermal decomposition to a gaseous component and a solid activated carbonaceous product;
  (b) substantially continuously moving said material, as a packed bed and at a predetermined rate, downwardly through and outwardly from the bottom of said reactor, while withdrawing gases upwardly therethrough and offgases outwardly therefrom;
  (c) injecting air into said bed at least at three levels which are vertically spaced from one another and from said top and bottom of said reactor, to establish a primary activation zone at least one foot in depth, said air being injected at said levels at significantly different rates independently controlled so as to distribute it, and to thereby render said primary zone substantially isothermal, with said material therein having a substantially uniform temperature of about 1600° to about 1800° Fahrenheit, the combined rate of air injection being less than one pound of air per pound of said feed material, on a moisture-free basis;
  (d) injecting low temperature steam, in the substantial absence of oxygen, into said bed at a location spaced downwardly from said primary zone and at a rate of about 0.025 to 0.2 pound per pound of said feed material, on a moisture-free basis, to establish a secondary activation zone of substantial depth below said primary zone, said steam being injected at a rate just adequate to transport sufficient thermal energy from said secondary activation zone to the top of said bed for drying and thermal decomposition of said material, to produce a temperature of about 250° to 600° Fahrenheit in said off-gases and to cool said material exiting from said secondary zone to a temperature of about 200° to 1500° Fahrenheit, said material having an average residence time in said primary activation zone of about three to 90 minutes, and said exiting material comprising a substantially dry activated carbonaceous product having a surface area of about 600 to 900 square meters per gram.

21. The process of claim 20 wherein said combined air injection rate is about 0.25 to 0.75 pound of air per pound of said feed, and is proportionate to said surface area of said product.

22. The process of claim 21 wherein said independent rates of air injection vary so as to distribute said air throughout said primary zone at upwardly diminishing rates, based upon the depth thereof.

23. The process of claim 20 wherein said primary activation zone is about one to 100 square feet in cross-sectional area.

24. The process of claim 23 wherein said cross-sectional area is about 15 to 40 square feet.

25. The process of claim 23 wherein said primary activation zone is less than above five feet in depth.

* * * * *